(12) United States Patent
Roy et al.

(10) Patent No.: US 11,405,078 B1
(45) Date of Patent: Aug. 2, 2022

(54) DEVICE FOR IMPLEMENTING BEAMFORMING IN WIRELESS NETWORKS

(71) Applicant: NXP USA, Inc., Austin, TX (US)

(72) Inventors: Sayak Roy, Kolkata (IN); Ankit Sethi, Pune (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/445,749

(22) Filed: Aug. 24, 2021

(51) Int. Cl.
*H04B 7/0456* (2017.01)
*H04B 7/06* (2006.01)

(52) U.S. Cl.
CPC ......... *H04B 7/0456* (2013.01); *H04B 7/0617* (2013.01)

(58) Field of Classification Search
CPC .. H04B 7/0456; H04B 7/0617; H04B 7/0408; H04B 7/0697; H04B 17/309; H04L 1/06; H04L 25/0242; H04L 2025/03426; H04L 2025/03414; H04L 25/0202; H04L 25/0204; H04W 16/28
See application file for complete search history.

(56) References Cited

U.S. PATENT DOCUMENTS

| | | | |
|---|---|---|---|
| 6,873,606 B2 | 3/2005 | Agrawal et al. | |
| 8,315,151 B2 * | 11/2012 | Ancora | H04W 52/143 370/344 |
| 8,526,992 B2 | 9/2013 | Hui et al. | |
| 9,231,682 B2 | 1/2016 | Shany et al. | |
| 10,447,358 B2 | 10/2019 | Vu | |
| 10,601,486 B1 | 3/2020 | Roy et al. | |
| 2009/0080556 A1 * | 3/2009 | Duan | H04L 27/2617 714/746 |
| 2016/0036561 A1 * | 2/2016 | Stapler | G06F 11/10 714/776 |
| 2016/0065275 A1 * | 3/2016 | Reuven | H04L 1/005 375/267 |

(Continued)

OTHER PUBLICATIONS

Zahra Rezaei, Ehsan Yazdian, Foroogh S. Tabataba, and Saeed Gazor, "Optimal Energy Beamforming under Per-Antenna Power Constraint", Transactions on Emerging Telecommunications Technologies, Dec. 27, 2019, vol. 31, Issue. 3, Wiley Online Library.

(Continued)

*Primary Examiner* — Khanh C Tran (57) ABSTRACT

A beamformee executes a singular value decomposition operation on a channel coefficient matrix to generate a diagonal matrix and a unitary matrix. The beamformee extracts a submatrix from each of the diagonal matrix and the unitary matrix. Each of a number of rows and a number of columns of the submatrix extracted from the diagonal matrix is equal to a number of spatial streams associated with a beamformer. Further, the submatrix extracted from the unitary matrix has a number of rows and a number of columns equal to a number of beamformer antennas of the beamformer and the number of spatial streams, respectively. The beamformee generates a subspace matrix that is a product of the submatrix extracted from the diagonal matrix and a conjugate transpose of the submatrix extracted from the unitary matrix. Further, the beamformee generates a steering matrix based on the subspace matrix.

20 Claims, 6 Drawing Sheets

(56) References Cited

U.S. PATENT DOCUMENTS

2020/0077470 A1* 3/2020 Xiong .................. H04W 88/06
2021/0306194 A1* 9/2021 Eger .................. H04L 27/2647

OTHER PUBLICATIONS

Phuong Le Cao, Tobias J. Oechtering, and Mikael Skoglund, "Optimal transmission with per-antenna power constraints for multiantenna bidirectional broadcast channels", 2016 IEEE Sensor Array and Multichannel Signal Processing Workshop (SAM), Sep. 19, 2016, IEEE, Rio de Janeiro, Brazil.

Emil Björnson, Mats Bengtsson, and Björn Ottersten, "Optimal Multiuser Transmit Beamforming: A Difficult Problem with a Simple Solution Structure [Lecture Notes]", IEEE Signal Processing Magazine, Jul. 2014, pp. 142-148, vol. 31, Issue. 4, IEEE.

Zhouyue Pi, "Optimal transmitter beamforming with per-antenna power constraints", 2012 IEEE International Conference on Communications (ICC), Nov. 29, 2012, IEEE, Ottawa, ON, Canada.

Shahram Shahsavari, S. Amir Hosseini, Chris Ng, and Elza Erkip, "On the Optimal Two-Antenna Static Beamforming With Per-Antenna Power Constraints", IEEE Signal Processing Letters, Sep. 2019, pp. 1388-1392, vol. 26, Issue. 9, IEEE.

Qinfei Huang, Mounir Ghogho, Wenjing Cheng, and Jibo Wei, "Transmit beamforming for MISO frequency-selective channels with per-antenna power constraint and limited-rate feedback", 2010 IEEE 11th International Workshop on Signal Processing Advances in Wireless Communications (SPAWC), Dec. 17, 2020, IEEE, Marrakech, Morocco.

Mikihito Suzuki, Yoshihisa Kishiyama, and Kenichi Higuchi, "Combination of Beamforming with Per-Antenna Power Constraint and Adaptive PAPR Reduction Method Using Null Space in MIMO Channel for Multiuser Massive MIMO-OFDM Transmission", 2018 21st International Symposium on Wireless Personal Multimedia Communications (WPMC), May 13, 2019, IEEE, Chiang Rai, Thailand.

\* cited by examiner

DEVICE FOR IMPLEMENTING BEAMFORMING IN WIRELESS NETWORKS

BACKGROUND

The present disclosure relates generally to wireless networks, and more particularly, to a device for implementing beamforming in wireless networks.

Beamforming is implemented in wireless networks to increase energy levels of wireless signals communicated between wireless devices. A wireless device transmitting the wireless signals is referred to as a beamformer, and a wireless device receiving the wireless signals is referred to as a beamformee. Examples of such wireless devices can include an access point, a wireless client (e.g., a mobile device), or the like. To initialize beamforming, the beamformer generates and transmits a null data packet (NDP) to the beamformee. Based on the received NDP, the beamformee generates and transmits a steering matrix to the beamformer. Typically, the beamformee includes a processing circuit for generating the steering matrix and various antennas for transmitting the steering matrix to the beamformer. When a number of spatial streams of the beamformer is less than a number of antennas of the beamformer and the beamformer has a fixed transmit power budget associated therewith, the beamformer executes a row normalization operation on the received steering matrix. The execution of the row normalization operation ensures that an output power associated with each beamformer antenna is equal. Such a steering matrix is then utilized by the beamformer to beamform the wireless signals to the beamformee.

Typically, the steering matrix is a right singular vector matrix of a channel coefficient matrix associated with a channel between the beamformer and the beamformee. The row normalization of such a steering matrix distorts the steering matrix, thereby degrading a beamforming performance between the beamformer and the beamformee. To ensure that the row normalization of the steering matrix does not distort the steering matrix, the beamformee typically executes a convex optimization technique for generating the steering matrix. However, to execute the convex optimization technique, various control circuits are required to be included in the beamformee, in addition to the processing circuit. Such additional control circuits lead to a significant increase in a design complexity and a manufacturing cost of the beamformee. Therefore, there exists a need for a technical solution that solves the aforementioned problems of existing beamformees.

SUMMARY

In an embodiment of the present disclosure, a beamformee is disclosed. The beamformee can include a processing circuit that is configured to execute a first singular value decomposition operation on a channel coefficient matrix associated with a channel between the beamformee and a beamformer. The processing circuit can execute the first singular value decomposition operation on the channel coefficient matrix to generate a diagonal matrix and a first unitary matrix. The processing circuit can be further configured to extract a first submatrix and a second submatrix from the diagonal matrix and the first unitary matrix, respectively. The first submatrix can have a number of rows equal to a first count of a plurality of spatial streams associated with the beamformer and a number of columns equal to the first count. Further, the second submatrix can have a number of rows and a number of columns equal to a second count of a plurality of beamformer antennas of the beamformer and the first count, respectively. The processing circuit can be further configured to generate a subspace matrix such that the subspace matrix is a product of the first submatrix and a conjugate transpose of the second submatrix. Further, the processing circuit can be configured to generate a steering matrix based on the subspace matrix. Beamforming between the beamformer and the beamformee can be implemented based on the steering matrix.

In another embodiment of the present disclosure, a beamforming method is disclosed. The beamforming method can include executing, by a beamformee, a first singular value decomposition operation on a channel coefficient matrix associated with a channel between the beamformee and a beamformer. The first singular value decomposition operation can be executed on the channel coefficient matrix to generate a diagonal matrix and a first unitary matrix. The beamforming method can further include extracting a first submatrix and a second submatrix from the diagonal matrix and the first unitary matrix, respectively, by the beamformee. The first submatrix can have a number of rows equal to a first count of a plurality of spatial streams associated with the beamformer and a number of columns equal to the first count. The second submatrix can have a number of rows and a number of columns equal to a second count of a plurality of beamformer antennas of the beamformer and the first count, respectively. The beamforming method can further include generating a subspace matrix by the beamformee such that the subspace matrix is a product of the first submatrix and a conjugate transpose of the second submatrix. Further, the beamforming method can include generating a steering matrix by the beamformee based on the subspace matrix. Beamforming between the beamformer and the beamformee can be implemented based on the steering matrix.

In some embodiments, the beamformee can further include a plurality of beamformee antennas that are coupled with the processing circuit. The processing circuit can be further configured to receive, using the plurality of beamformee antennas, a null data packet (NDP) from the beamformer. Further, the processing circuit can be configured to generate, based on the NDP, the channel coefficient matrix such that a number of rows and a number of columns of the channel coefficient matrix are equal to a third count of the plurality of beamformee antennas and the second count, respectively.

In some embodiments, the diagonal matrix can have a number of rows and a number of columns equal to the third count and the second count, respectively. The first unitary matrix can have a number of rows equal to the second count and a number of columns equal to the second count.

In some embodiments, the beamformee can further include a plurality of beamformee antennas that are coupled with the processing circuit. The processing circuit can be further configured to transmit, using the plurality of beamformee antennas, the steering matrix to the beamformer.

In some embodiments, the beamformee can further include a plurality of beamformee antennas that are coupled with the processing circuit. The processing circuit can be further configured to receive, from the beamformer using the plurality of beamformee antennas, a set of wireless signals that is generated based on the steering matrix.

In some embodiments, the first singular value decomposition operation can include a plurality of QR decomposition operations.

In some embodiments, the processing circuit can be further configured to generate the conjugate transpose of the second submatrix.

In some embodiments, to generate the steering matrix, the processing circuit can be further configured to initialize the steering matrix such that the steering matrix corresponds to the second submatrix, and iteratively update the steering matrix based on the subspace matrix.

In some embodiments, to iteratively update the steering matrix, the processing circuit can be further configured to generate a normalization vector based on the steering matrix, and generate a first intermediate matrix based on the normalization vector and the subspace matrix. The normalization vector can include a plurality of normalization elements. A fourth count of the plurality of normalization elements is equal to the second count. Further, the first intermediate matrix can be generated such that a number of rows and a number of columns of the first intermediate matrix are equal to the first count and the second count, respectively.

In some embodiments, to iteratively update the steering matrix, the processing circuit can be further configured to generate a conjugate transpose of the first intermediate matrix and generate a second intermediate matrix. The second intermediate matrix can be generated such that the second intermediate matrix is a product of the conjugate transpose of the first intermediate matrix, the first intermediate matrix, and the steering matrix. Further, to iteratively update the steering matrix, the processing circuit can be configured to execute a QR decomposition operation on the second intermediate matrix to generate a second unitary matrix, extract a third submatrix from the second unitary matrix, and assign the third submatrix as the steering matrix. The second unitary matrix can have a number of rows equal to the second count and a number of columns equal to the second count. The third submatrix can be extracted from the second unitary matrix such that a number of rows and a number of columns of the third submatrix are equal to the second count and the first count, respectively.

In some embodiments, to iteratively update the steering matrix, the processing circuit can be further configured to execute a second singular value decomposition operation on the first intermediate matrix to generate a third unitary matrix. The third unitary matrix can have a number of rows equal to the second count and a number of columns equal to the second count. Further, to iteratively update the steering matrix, the processing circuit can be configured to extract a fourth submatrix from the third unitary matrix and assign the fourth submatrix as the steering matrix. The fourth submatrix can be extracted from the third unitary matrix such that a number of rows and a number of columns of the fourth submatrix are equal to the second count and the first count, respectively.

In some embodiments, each normalization element of the plurality of normalization elements is inversely proportional to a row norm of an associated row of the steering matrix and a regularization factor. The regularization factor can decrease with each iteration associated with the steering matrix.

In some embodiments, the first intermediate matrix can be a scaled version of the subspace matrix such that a first column of the first intermediate matrix is a product of a first normalization element of the plurality of normalization elements and a first column of the subspace matrix.

Various embodiments of the present disclosure disclose a beamformee that can include multiple beamformee antennas and a processing circuit. The processing circuit can execute a singular value decomposition operation on a channel coefficient matrix to generate a diagonal matrix and a unitary matrix. The channel coefficient matrix is associated with a channel between the beamformee and a beamformer. The diagonal matrix can have a number of rows and a number of columns equal to a number of beamformee antennas of the beamformee and a number of beamformer antennas of the beamformer, respectively. Further, the unitary matrix can have a number of rows and a number of columns that are both equal to the number of beamformer antennas.

The processing circuit can extract one submatrix from each of the diagonal matrix and the unitary matrix. The submatrix extracted from the diagonal matrix can have a number of rows and a number of columns that are both equal to a number of spatial streams associated with the beamformer. Further, the submatrix extracted from the unitary matrix can have a number of rows and a number of columns equal to the number of beamformer antennas and the number of spatial streams, respectively. The processing circuit can generate a subspace matrix such that the subspace matrix is a product of the submatrix extracted from the diagonal matrix and a conjugate transpose of the submatrix extracted from the unitary matrix. Further, the processing circuit can generate a steering matrix based on the subspace matrix, and transmit the steering matrix to the beamformer using the beamformee antennas. Beamforming can then be implemented between the beamformer and the beamformee based on the steering matrix.

The beamformee of the present disclosure generates the steering matrix based on a right singular vector matrix of a product of a subspace of the channel coefficient matrix and another diagonal matrix. This ensures that the steering matrix is not distorted when the row normalization operation is executed thereon. Further, the beamformee generates the steering matrix by iteratively updating the submatrix extracted from the unitary matrix. Such iterative update operations include matrix generation and decomposition operations that are executed by the same circuit (i.e., the processing circuit) that generates the diagonal matrix and unitary matrix. As a result, a need to include additional control circuits in the beamformee for generating the steering matrix is eliminated. Hence, a design complexity of the beamformee of the present disclosure is significantly less than that of a conventional beamformee that includes additional control circuits for executing a convex optimization technique to generate the steering matrix. Additionally, a manufacturing cost of the beamformee of the present disclosure is significantly less than that of the conventional beamformee.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
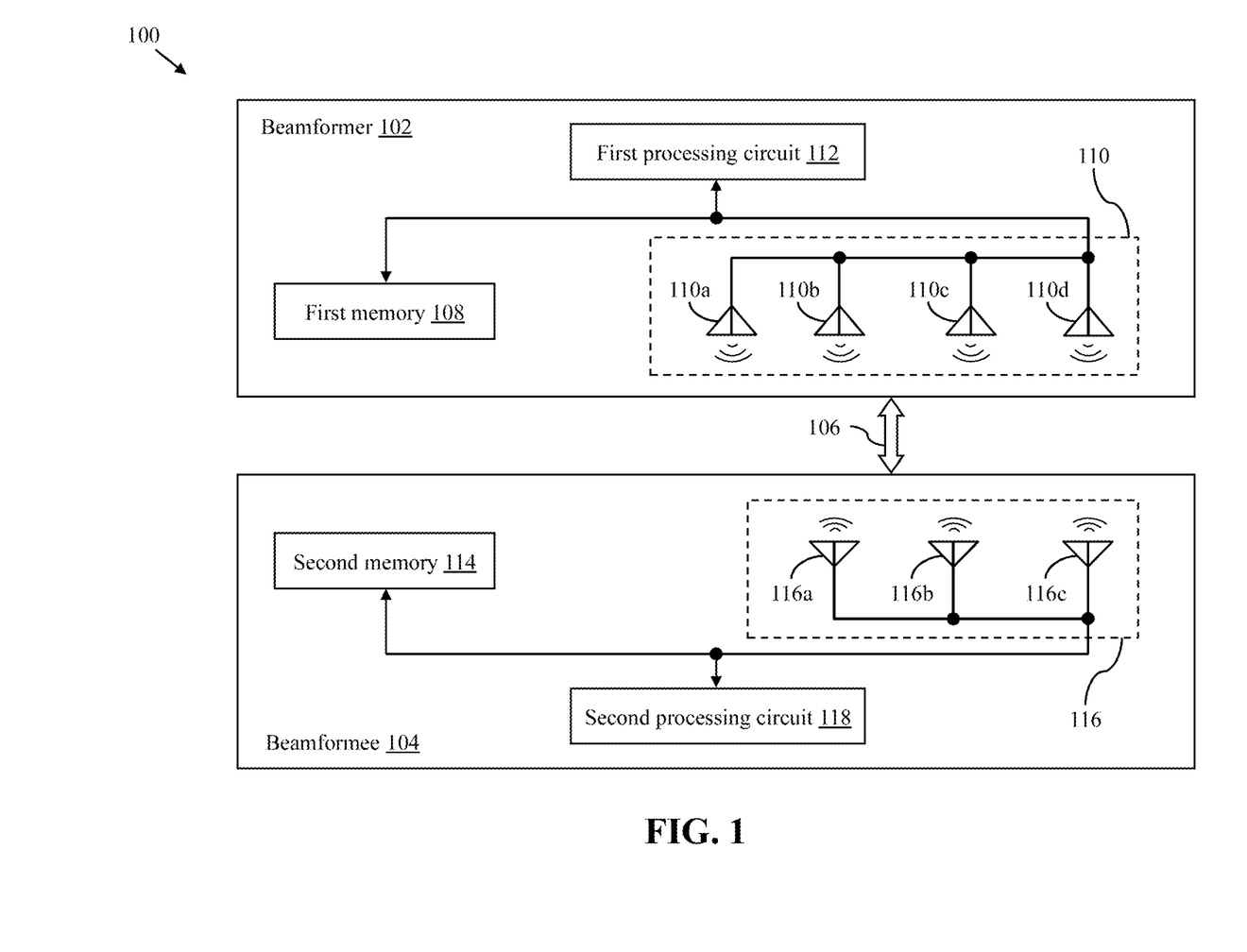
FIG. 1 illustrates a schematic block diagram of a wireless network in accordance with an embodiment of the present disclosure.

FIG. 1 illustrates a schematic block diagram of a wireless network 100 in accordance with an embodiment of the present disclosure. The wireless network 100 can include a beamformer 102, a beamformee 104, and a wireless channel 106 (hereinafter referred to as the "channel 106"). The beamformer 102 can be coupled with the beamformee 104 by way of the channel 106. The wireless network 100 can correspond to a wireless local area network, a multiple-input-multiple-output network, a worldwide interoperability for microwave access network, a network that complies with the Institute of Electrical and Electronics Engineers (IEEE) 802.11 standard, a cellular network, or the like.

When beamforming is implemented between two wireless devices (i.e., the beamformer 102 and the beamformee 104), the beamformer 102 corresponds to a wireless device that transmits various wireless signals in the wireless network 100. Conversely, the beamformee 104 corresponds to a wireless device that receives the wireless signals transmitted by the beamformer 102. The beamformer 102 can include a first memory 108, a plurality of beamformer antennas 110, and a first processing circuit 112. The beamformer 102 can further include a plurality of spatial streams (not shown) associated therewith. A first count of the plurality of spatial streams is less than a second count of the plurality of beamformer antennas 110. The plurality of beamformer antennas 110 can be configured to transmit various wireless signals by way of the plurality of spatial streams. Examples of the beamformer 102 can include an access point (AP), a wireless client (e.g., a mobile device), or the like. The beamformee 104 can include a second memory 114, a plurality of beamformee antennas 116, and a second processing circuit 118. A third count of the plurality of beamformee antennas 116 can be greater than or equal to the first count. In other words, the first count can be less than or equal to a minimum of the second and third counts. Examples of the beamformee 104 can include an AP, a wireless client, or the like. When the beamformer 102 is an AP, the beamformee 104 can be a wireless client. Alternatively, when the beamformer 102 is a wireless client, the beamformee 104 can be an AP.

The first memory 108 can be configured to store various instructions that when executed by the first processing circuit 112 cause the first processing circuit 112 to execute various operations for enabling beamforming in the wireless network 100. The instructions stored in the first memory 108 are pursuant to various standards and protocols (e.g., the IEEE 802.11 standard) set forth for wireless communication. Examples of the first memory 108 may include a solid-state drive, a random-access memory, a read-only memory, a hard disk drive, a flash memory, a removable storage device, or the like.

The plurality of beamformer antennas 110 can be configured to wirelessly communicate with the beamformee 104 (i.e., the plurality of beamformee antennas 116 and the second processing circuit 118). In an embodiment, the plurality of beamformer antennas 110 can include first through fourth beamformer antennas 110a-110d. Each of the first through fourth beamformer antennas 110a-110d has various antenna elements. The arrangement of the plurality of beamformer antennas 110 (i.e., the antenna elements of the first through fourth beamformer antennas 110a-110d) enables beamforming with the beamformee 104.

The first processing circuit 112 can be coupled with the first memory 108 and the plurality of beamformer antennas 110. Further, the first processing circuit 112 can be coupled with the beamformee 104 (i.e., the plurality of beamformee antennas 116 and the second processing circuit 118) by way of the plurality of beamformer antennas 110 and the channel 106. The first processing circuit 112 can include suitable circuitry that can be configured to execute one or more operations. For example, the first processing circuit 112 can be configured to execute the instructions stored in the first memory 108.

The first processing circuit 112 can be configured to generate a null data packet (NDP) (shown later in FIG. 2A). Further, the first processing circuit 112 can be configured to transmit, using the plurality of beamformer antennas 110, the NDP to the beamformee 104 to obtain channel state information associated with the channel 106. In response to the NDP, the first processing circuit 112 can be further configured to receive a steering matrix (shown later in FIG. 2B) from the beamformee 104. The steering matrix can be indicative of the channel state information, and can define the arrangement of each antenna element of the plurality of beamformer antennas 110 to select a spatial path for wireless signal transmission towards the beamformee 104. The NDP can include various long training fields (LTFs) that can be utilized by the beamformee 104 to generate the steering matrix.

The first processing circuit 112 can be further configured to execute a row normalization operation on the steering matrix to generate a row-normalized steering matrix (shown later in FIG. 2B). The first processing circuit 112 can execute the row normalization operation when the first and second counts are unequal and the beamformer 102 has a fixed transmit power budget associated therewith. The row normalization operation can be executed on the steering matrix to ensure that an output power associated with each beamformer antenna of the plurality of beamformer antennas 110 is same. The row normalization operation can correspond to the multiplication of a scaling matrix (not shown) with the steering matrix. Diagonal elements of the scaling matrix can correspond to the inverse of row norms (e.g., Euclidean norms) of rows of the steering matrix. Further, the first processing circuit 112 can be configured to generate a set of wireless signals (shown later in FIG. 2B) and transmit, based on the row-normalized steering matrix, the set of wireless signals to the beamformee 104. The first processing circuit 112 transmits the set of wireless signals to the beamformee 104 using the plurality of beamformer antennas 110.

The second memory 114 can be configured to store various instructions that when executed by the second processing circuit 118 cause the second processing circuit 118 to execute operations for implementing beamforming in the wireless network 100. The instructions stored in the second memory 114 are pursuant to various standards and protocols (e.g., the IEEE 802.11 standard) set forth for wireless communication. Examples of the second memory 114 may include a solid-state drive, a random-access memory, a read-only memory, a hard disk drive, a flash memory, a removable storage device, or the like.

The plurality of beamformee antennas 116 can be configured to wirelessly communicate with the beamformer 102 (i.e., the plurality of beamformer antennas 110 and the first processing circuit 112). In an embodiment, the plurality of beamformee antennas 116 can include first through third beamformee antennas 116a-116c.

The second processing circuit 118 can be coupled with the second memory 114 and the plurality of beamformee antennas 116. Further, the second processing circuit 118 can be coupled with the beamformer 102 (i.e., the plurality of beamformer antennas 110 and the first processing circuit 112) by way of the plurality of beamformee antennas 116 and the channel 106. The second processing circuit 118 can include suitable circuitry that can be configured to execute one or more operations. For example, the second processing circuit 118 can be configured to execute the instructions stored in the second memory 114.

The second processing circuit 118 can be configured to receive, using the plurality of beamformee antennas 116, the NDP from the beamformer 102. Based on the NDP, the second processing circuit 118 can be configured to generate a channel coefficient matrix (shown later in FIG. 2A) associated with the channel 106. The channel coefficient matrix can be generated such that a number of rows and a number of columns of the channel coefficient matrix can be equal to the third count and the second count, respectively.

The second processing circuit 118 can be further configured to execute a first singular value decomposition operation on the channel coefficient matrix. In an embodiment, the first singular value decomposition operation can include a plurality of QR decomposition operations. The second processing circuit 118 can execute the first singular value decomposition operation on the channel coefficient matrix to generate a first diagonal matrix (shown later in FIG. 2A) and a first unitary matrix (shown later in FIG. 2A). The first diagonal matrix can have a number of rows and a number of columns equal to the third count and the second count, respectively. Further, the first unitary matrix can have a number of rows equal to the second count and a number of columns equal to the second count. The first unitary matrix can also be referred to as a right singular vector matrix of the channel coefficient matrix.

The second processing circuit 118 can be further configured to extract a first submatrix (shown later in FIG. 2A) and a second submatrix (shown later in FIG. 2A) from the first diagonal matrix and the first unitary matrix, respectively. The first submatrix can have a number of rows equal to the first count and a number of columns equal to the first count. Further, the second submatrix can have a number of rows and a number of columns equal to the second count and the first count, respectively. The second processing circuit 118 can be further configured to generate a conjugate transpose of the second submatrix. The second processing circuit 118 can be further configured to generate a subspace matrix (shown later in FIG. 2A) such that the subspace matrix is a product of the first submatrix and the conjugate transpose of the second submatrix. Thus, the subspace matrix can have a number of rows and a number of columns equal to the first count and the second count, respectively. The subspace matrix is a pruned matrix that includes dominant elements (i.e., elements that are involved in beamforming) of the first diagonal matrix and the first unitary matrix. The second processing circuit 118 can be further configured to generate the steering matrix based on the subspace matrix.

To generate the steering matrix, the second processing circuit 118 can be further configured to initialize the steering matrix such that the steering matrix corresponds to the second submatrix, and iteratively update the steering matrix based on the subspace matrix. In other words, for a first iteration, the steering matrix is equal to the second submatrix. The steering matrix can thus have a number of rows and a number of columns equal to the second count and the first count, respectively. Further, the steering matrix is updated with each subsequent iteration such that the steering matrix converges to a desired steering matrix.

To iteratively update the steering matrix, the second processing circuit 118 can be configured to perform various operations. For example, the second processing circuit 118 can be further configured to generate a normalization vector (not shown) based on the steering matrix. The normalization vector can include a plurality of normalization elements (not shown). A fourth count of the plurality of normalization elements can be equal to the second count. In other words, the fourth count of the plurality of normalization elements can be equal to the number of rows of the steering matrix.

Each normalization element of the plurality of normalization elements can be inversely proportional to a row norm of an associated row of the steering matrix and a regularization factor (not shown). In an embodiment, each normalization element of the plurality of normalization elements can be inversely proportional to a sum of the row norm of the associated row of the steering matrix and the regularization factor. Further, the regularization factor decreases with each iteration associated with the steering matrix. The regularization factor can ensure that, with each iteration, the steering matrix converges to the desired steering matrix.

Although it is described that the regularization factor decreases with each iteration, the scope of the present disclosure is not limited to it. In various other embodiments, the regularization factor can remain constant for each iteration associated with the steering matrix or decrease after a predefined number of iterations associated with the steering matrix, without deviating from the scope of the present disclosure.

The second processing circuit 118 can be further configured to generate, based on the normalization vector and the subspace matrix, a first intermediate matrix (not shown). The first intermediate matrix can be generated such that a number of rows and a number of columns of the first intermediate matrix can be equal to the first count and the second count, respectively. The first intermediate matrix can be a scaled version of the subspace matrix such that a first column of the first intermediate matrix is a product of a first normalization element of the plurality of normalization elements and a first column of the subspace matrix. In other words, the first intermediate matrix can correspond to a product of the subspace matrix (i.e., a subspace of the channel coefficient matrix) and a second diagonal matrix (i.e., a matrix having the plurality of normalization elements as diagonal elements).

The second processing circuit 118 can be further configured to generate a conjugate transpose of the first intermediate matrix. Further, the second processing circuit 118 can be configured to generate a second intermediate matrix (not shown) such that the second intermediate matrix is a product of the conjugate transpose of the first intermediate matrix, the first intermediate matrix, and the steering matrix. The second intermediate matrix can thus have a number of rows and a number of columns equal to the second count and the first count, respectively. The second processing circuit 118 can be further configured to execute a QR decomposition operation on the second intermediate matrix to generate a second unitary matrix (not shown). The second unitary matrix can have a number of rows equal to the second count and a number of columns equal to the second count.

The second processing circuit 118 can be further configured to extract a third submatrix (not shown) from the second unitary matrix. The third submatrix can be extracted from the second unitary matrix such that a number of rows and a number of columns of the third submatrix can be equal to the second count and the first count, respectively. Further, the second processing circuit 118 can be configured to assign the third submatrix as the steering matrix. The steering matrix can thus be generated based on the right singular vector matrix of a product of the subspace matrix (i.e., the subspace of the channel coefficient matrix) and the second diagonal matrix.

The above-described operations executed by the second processing circuit 118 corresponds to the first iteration. The second processing circuit 118 can similarly execute multiple iterations to update the steering matrix such that the steering matrix converges to the desired steering matrix. The desired steering matrix (i.e., the third submatrix of the last iteration) is such that when the row normalization operation is executed thereon, the steering matrix is not distorted, thereby ensuring optimal beamforming performance between the beamformer 102 and the beamformee 104. Beamforming between the beamformer and the beamformee can be implemented based on the steering matrix.

The second processing circuit 118 can be further configured to transmit, using the plurality of beamformee antennas 116, the steering matrix (i.e., the third submatrix of the last iteration) to the beamformer 102. In response to the steering matrix, the second processing circuit 118 (i.e., the beamformee 104) can be further configured to receive the set of wireless signals from the beamformer 102 using the plurality of beamformee antennas 116.

Although it is described that the beamformee 104 (i.e., the second processing circuit 118) transmits the steering matrix in response to the NDP, the scope of the present disclosure is not limited to it. In an alternate embodiment, the beamformee 104 can compress the steering matrix and transmit the compressed steering matrix to the beamformer 102, without deviating from the scope of the present disclosure. In such a scenario, the beamformer 102 (i.e., the first processing circuit 112) can be further configured to receive the compressed steering matrix from the beamformee 104, and process the compressed steering matrix to regenerate the steering matrix. The regenerated steering matrix can be then utilized for beamforming the set of wireless signals.

It will be apparent to a person skilled in the art that the wireless network 100 is shown to include a single beamformee (i.e., the beamformee 104) to make the illustrations concise and clear and should not be considered as a limitation of the present disclosure. In various other embodiments, the wireless network 100 may include more than one beamformee, without deviating from the scope of the present disclosure. In such a scenario, the operations of each additional beamformee can be similar to that of the beamformee 104 as described above.

The scope of the present disclosure is not limited to the beamformee 104 generating the steering matrix in the above-described manner. In various other embodiments, the beamformee 104 can generate the steering matrix differently as compared to that described above. In such a scenario, the operations executed by the beamformee 104 to iteratively update the steering matrix, after the steering matrix is initialized to be equal to the second submatrix, are different than that described above. For example, the second processing circuit 118 (i.e., the beamformee 104) can be configured to generate the normalization vector based on the steering matrix. In the first iteration, the steering matrix can correspond to the second submatrix. The second processing circuit 118 can be further configured to generate, based on the normalization vector and the subspace matrix, the first intermediate matrix.

The second processing circuit 118 can be further configured to execute a second singular value decomposition operation on the first intermediate matrix to generate a third unitary matrix. The third unitary matrix can be also referred to as a right singular vector matrix of the first intermediate matrix. Further, the third unitary matrix can be generated such that each of a number of rows and a number of columns of the third unitary matrix can be equal to the second count. The second processing circuit 118 can be further configured to extract a fourth submatrix (not shown) from the third unitary matrix such that a number of rows and a number of columns of the fourth submatrix can be equal to the second count and the first count, respectively. Further, the second processing circuit 118 can be configured to assign the fourth submatrix as the steering matrix. The steering matrix can thus be generated based on the right singular vector matrix of the product of the subspace matrix (i.e., the subspace of the channel coefficient matrix) and the second diagonal matrix.

The above-described operations executed by the second processing circuit 118 corresponds to the first iteration. The second processing circuit 118 can similarly execute various iterations to update the steering matrix such that the steering matrix converges to the desired steering matrix. The steering matrix of the last iteration (i.e., the third submatrix of the last iteration) is such that when the row normalization operation is executed thereon, the steering matrix is not distorted, thereby ensuring optimal beamforming performance between the beamformer 102 and the beamformee 104.

Figure 2A:
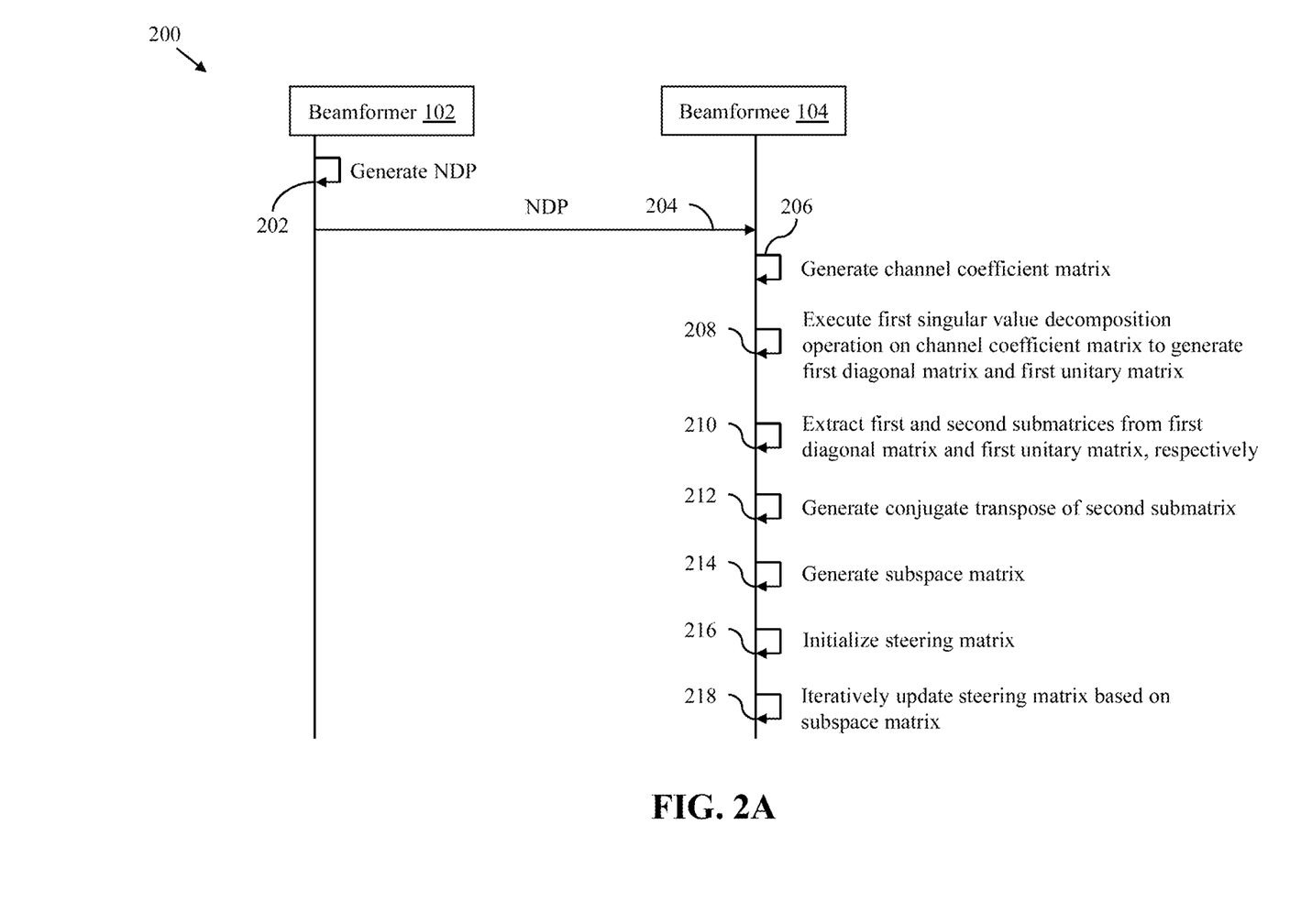
FIGS. 2A and 2B, collectively, represents a sequence diagram that illustrates beamforming between a beamformer of the wireless network of FIG. 1 and a beamformee of the wireless network of FIG. 1 in accordance with an embodiment of the present disclosure.
Figure 2B:
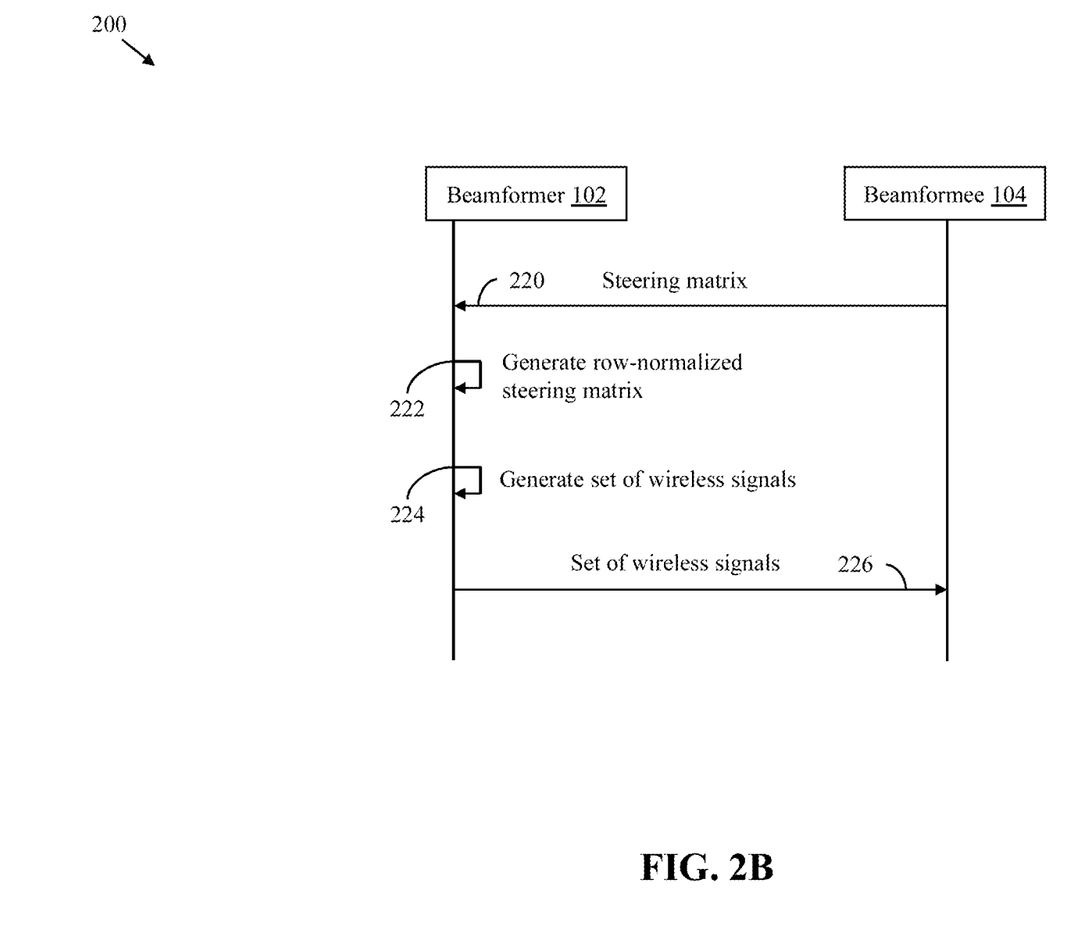

FIGS. 2A and 2B, collectively, represents a sequence diagram 200 that illustrates beamforming between the beamformer 102 and the beamformee 104 in accordance with an embodiment of the present disclosure. Referring now to FIG. 2A, the beamformer 102 can generate the NDP (as shown by arrow 202). The NDP can include the plurality of LTFs. The beamformer 102 can then transmit the NDP to the beamformee 104 (as shown by arrow 204). The beamformer 102 transmits the NDP to the beamformee 104 to obtain the channel state information associated with the channel 106.

The beamformee 104 can generate the channel coefficient matrix (as shown by arrow 206). The beamformee 104 can generate the channel coefficient matrix based on the NDP received from the beamformer 102. The number of rows and the number of columns of the channel coefficient matrix can be equal to the third count and the second count, respectively. Further, the beamformee 104 can execute the first singular value decomposition operation on the channel coefficient matrix to generate the first diagonal matrix and the first unitary matrix (as shown by arrow 208). The first singular value decomposition operation corresponds to a factorization of the channel coefficient matrix. The number of rows and the number of columns of the first diagonal matrix can be equal to the third count and the second count, respectively. Further, each of the number of rows and the number of columns of the first unitary matrix can be equal to the second count. The first singular value decomposition of the channel coefficient matrix is illustrated below in equation (1):

$$H_{nRx,nTx} = (U_H)_{nRx,nRx} * (\Delta_H)_{nRx,nTx} * [(V_H)_{nTx,nTx}]^H \quad (1)$$

where,
nTx is the second count,
nRx is the third count,
$(U_H)_{nRx,nRx}$ is a fourth unitary matrix, i.e., a left singular vector matrix of the channel coefficient matrix,
$(\Delta_H)_{nRx,nTx}$ is the first diagonal matrix,
$(V_H)_{nTx,nTx}$ is the first unitary matrix,
$[(V_H)_{nTx,nTx}]^H$ is the conjugate transpose of the first unitary matrix, and
$H_{nRx,nTx}$ is the channel coefficient matrix.

The beamformee 104 can extract the first and second submatrices from the first diagonal matrix and the first unitary matrix, respectively (as shown by arrow 210). Each of the number of rows and the number of columns of the first submatrix can be equal to the first count. Further, the number of rows and the number of columns of the second submatrix can be equal to the second count and the first count, respectively. The beamformee 104 can generate the conjugate transpose of the second submatrix (as shown by arrow 212). Further, the beamformee 104 can generate the subspace matrix (as shown by arrow 214). The subspace matrix is a product of the first submatrix and the conjugate transpose of the second submatrix. Thus, the number of rows and the number of columns of the subspace matrix can be equal to the first count and the second count, respectively. The subspace matrix is illustrated below in equation (2):

$$P_{nSS,nTx} = (\Delta_H)_{nSS,nSS} * [(V_H)_{nTx,nSS}]^H \qquad (2)$$

where,
nSS is the first count,
$(\Delta_H)_{nSS,nSS}$ is the first submatrix,
$(V_H)_{nTx,nSS}$ is the second submatrix,
$[(V_H)_{nTx,nSS}]^H$ is the conjugate transpose of the second submatrix, and
$P_{nSS,nTx}$ is the subspace matrix.

The beamformee 104 can generate the steering matrix based on the subspace matrix. To generate the steering matrix, the beamformee 104 can initialize the steering matrix (as shown by arrow 216) and iteratively update the steering matrix based on the subspace matrix (as shown by arrow 218). The steering matrix is initialized such that the steering matrix corresponds to the second submatrix. Thus, for the first iteration, the steering matrix is equal to the second submatrix. Further, with each iteration, the steering matrix is updated such that the steering matrix converges to the desired steering matrix. The steering matrix of the first iteration is illustrated below in equation (3):

$$Q_{nTx,nSS}^0 = (V_H)_{nTx,nSS} \qquad (3)$$

where,
$Q_{nTx,nSS}^0$ is the steering matrix of the first iteration.

To iteratively update the steering matrix, the beamformee 104 can perform various operations. For example, the beamformee 104 can generate, based on the steering matrix, the normalization vector that includes the plurality of normalization elements. Each normalization element of the plurality of normalization elements can be inversely proportional to the row norm of an associated row of the steering matrix and the regularization factor. Each normalization element of the normalization vector is generated as illustrated below in equation (4):

$$r_i = \frac{1}{\|Q_{i,:}^t\| + \varepsilon(t)} \qquad (4)$$

where,
t=0 for the first iteration,
$\|Q_{i,:}^t\|$ is the row norm of the $i^{th}$ row of the steering matrix of the $t^{th}$ iteration,
i ranges from 1 to nTx (i.e., $1 \leq i \leq nTx$),
$\varepsilon(t)$ is the regularization factor, and
$r_i$ is the $i^{th}$ normalization element.

The regularization factor decreases with each iteration associated with the steering matrix. The regularization factor can ensure that, with each iteration, the steering matrix can converge to the desired steering matrix. Examples of the regularization factor can include"

"$\frac{0.2}{t^2}$",

"$0.2*e^{-t/3}$", or the like.

The beamformee 104 can generate the first intermediate matrix based on the normalization vector and the subspace matrix. The number of rows and the number of columns of the first intermediate matrix can be equal to the first count and the second count, respectively. The first intermediate matrix can be a scaled version of the subspace matrix such that the first column of the first intermediate matrix is the product of the first normalization element of the plurality of normalization elements and the first column of the subspace matrix. The first intermediate matrix is generated as illustrated below in equation ($^5$):

$$G_{:,i} = r_i * P_{:,i} \qquad (5)$$

where,
$P_{:,i}$ is the $i^{th}$ column of the subspace matrix, and
$G_{:,i}$ is the $i^{th}$ column of the first intermediate matrix.

The beamformee 104 can generate the conjugate transpose of the first intermediate matrix. Further, the beamformee 104 can generate the second intermediate matrix such that the second intermediate matrix is the product of the conjugate transpose of the first intermediate matrix, the first intermediate matrix, and the steering matrix. The number of rows and the number of columns of the second intermediate matrix can be equal to the second count and the first count, respectively. The second intermediate matrix is illustrated below in equation (6):

$$F_{nTx,nSS} = [G_{nSS,nTx}]^H * G_{nSS,nTx} * Q_{nTx,nSS}^t \qquad (6)$$

where,
$G_{nSS,nTx}$ is the first intermediate matrix,
$[G_{nSS,nTx}]^H$ is the conjugate transpose of the first intermediate matrix,
$Q_{nTx,nSS}^t$ is the steering matrix of the $t^{th}$ iteration, and
$F_{nTx,nSS}$ is the second intermediate matrix.

The beamformee 104 can execute the QR decomposition operation on the second intermediate matrix to generate the second unitary matrix. Each of the number of rows and the number of columns of the second unitary matrix can be equal to the second count. The QR decomposition of the second intermediate matrix is illustrated below in equation (7):

$$F_{nTx,nSS} = (\emptyset)_{nTx,nTx} * R_{nTx,nSS} \qquad (7)$$

where,
$(\emptyset)_{nTx,nTx}$ is the second unitary matrix, and
$R_{nTx,nSS}$ is an upper triangular matrix.

The beamformee 104 can extract the third submatrix from the second unitary matrix. The third submatrix can be extracted from the second unitary matrix such that the number of rows and the number of columns of the third submatrix can be equal to the second count and the first count, respectively. Further, the beamformee 104 can assign the third submatrix as the steering matrix. The steering matrix of a subsequent iteration is illustrated below in equation (8):

$$Q_{nTx,nSS}^1 = (\emptyset)_{nTx,nSS} \qquad (8)$$

where, $(\emptyset)_{nTx,nSS}$ is the third submatrix.

The above-described operations executed by the beamformee 104 corresponds to the first iteration. The second processing circuit 118 can similarly execute various iterations to update the steering matrix such that the steering matrix converges to the desired steering matrix.

Referring now to FIG. 2B, the beamformee 104 can transmit the steering matrix (i.e., the third submatrix of the last iteration) to the beamformer 102 (as shown by arrow 220). The beamformee 104 can transmit the steering matrix to the beamformer 102 to implement beamforming between the beamformer 102 and the beamformee 104.

The beamformer 102 can generate the row-normalized steering matrix (as shown by arrow 222). The beamformer 102 can generate the row-normalized steering matrix by executing the row normalization operation on the steering matrix received from the beamformee 104. The beamformer 102 can generate the set of wireless signals (as shown by arrow 224). Further, the beamformer 102 can transmit, based on the row-normalized steering matrix, the set of wireless signals to the beamformee 104 (as shown by arrow 226).

The scope of the present disclosure is not limited to the beamformee 104 generating the steering matrix in the above-described manner. In various other embodiments, the beamformee 104 can generate the steering matrix differently as compared to that described above. In such a scenario, the operations executed by the beamformee 104 to iteratively update the steering matrix, after the steering matrix is initialized to be equal to the second submatrix, are different than that described above. For example, the beamformee 104 can generate the normalization vector and the first intermediate matrix. Further, the beamformee 104 can execute a second singular value decomposition operation on the first intermediate matrix to generate the third unitary matrix. Each of the number of rows and the number of columns of the third unitary matrix can be equal to the second count. The second singular value decomposition of the first intermediate matrix is illustrated below in equation (9):

$$G_{nSS,nTx} = (U_G)_{nSS,nSS} * (\Delta_G)_{nSS,nTx} * [(V_G)_{nTx,nTx}]^H \qquad (9)$$

where, $(U_G)_{nSS,nSS}$ is a fifth unitary matrix, i.e., a left singular vector matrix of the first intermediate matrix, $(\Delta_G)_{nSS,nTx}$ is a third diagonal matrix of the first intermediate matrix, $(V_G)_{nTx,nTx}$ is the third unitary matrix, and $[(V_G)_{nTx,nTx}]^H$ is the conjugate transpose of the third unitary matrix.

The beamformee 104 can extract the fourth submatrix from the third unitary matrix such that the number of rows and the number of columns of the fourth submatrix can be equal to the second count and the first count, respectively. Further, the beamformee 104 can be configured to assign the fourth submatrix as the steering matrix. Thus, the steering matrix of a subsequent iteration is illustrated below in equation (10):

$$Q_{nTx,nSS}^1 = (V_G)_{nTx,nSS} \qquad (10)$$

where, $(V_G)_{nTx,nSS}$ is the fourth submatrix.

The above-described operations executed by the beamformee 104 corresponds to the first iteration. The beamformee 104 can similarly execute various iterations to update the steering matrix such that the steering matrix converges to the desired steering matrix.

Figure 3A:
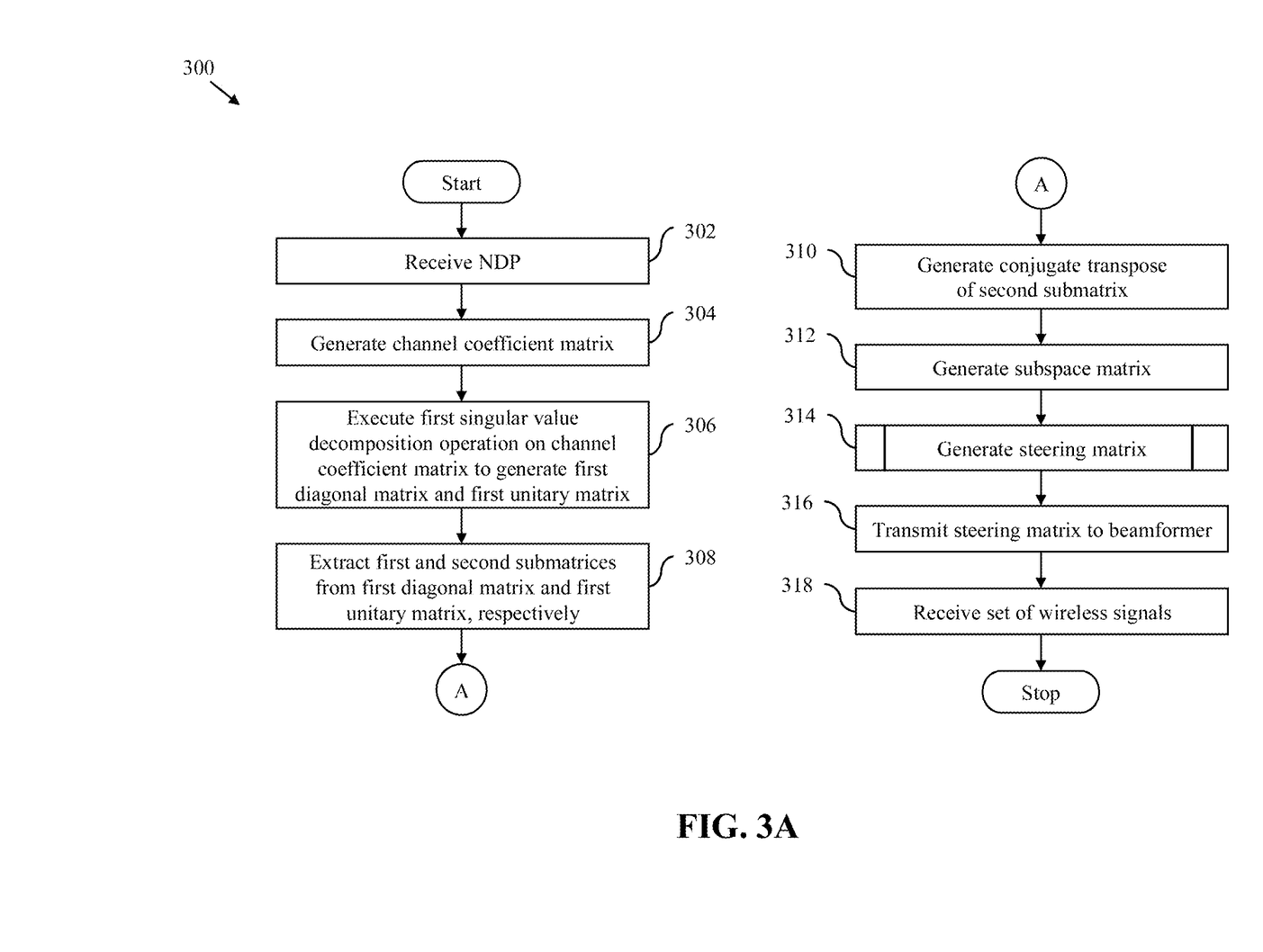
FIGS. 3A-3C, collectively, represents a flowchart that illustrates a beamforming method in accordance with an embodiment of the present disclosure.
Figure 3B:
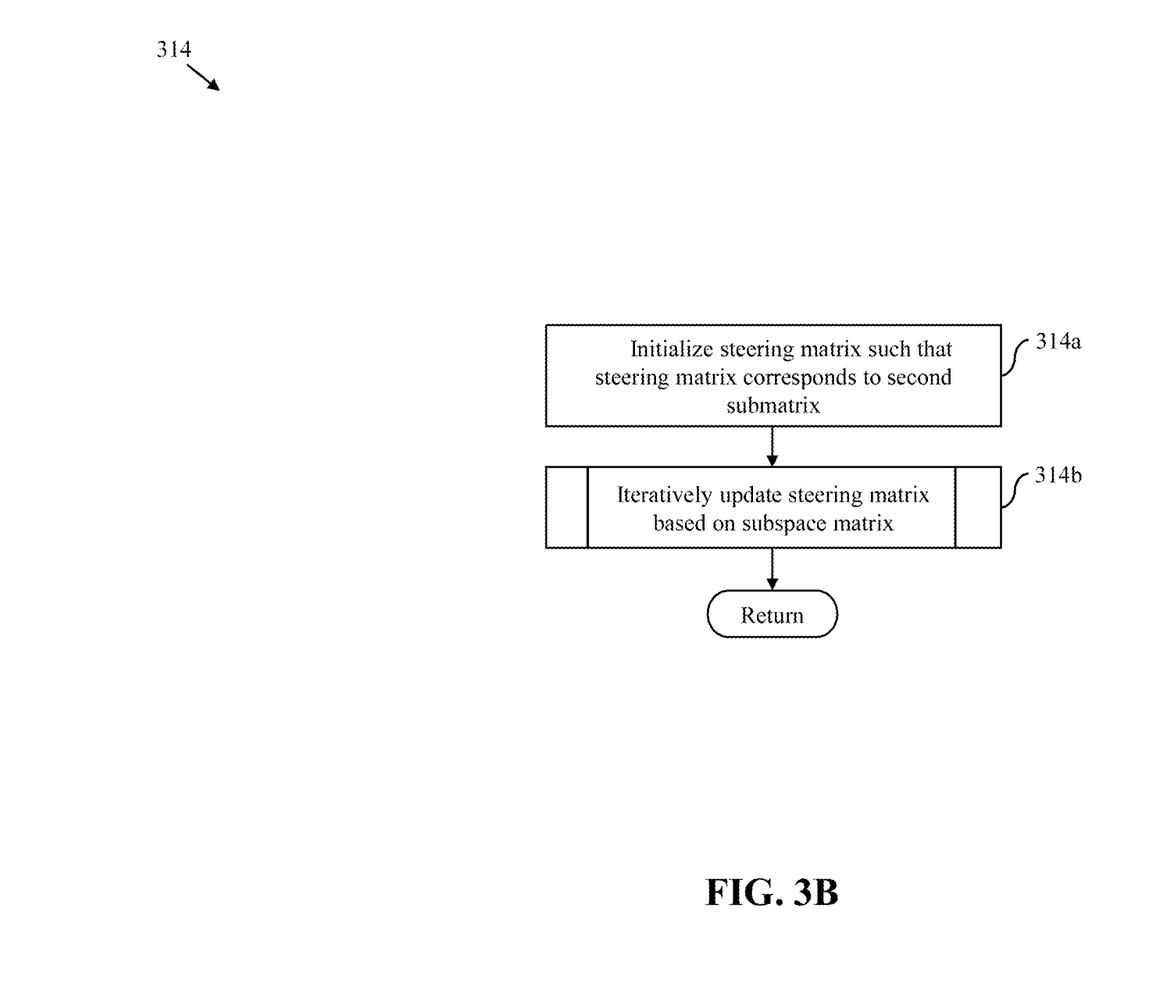
Figure 3C:
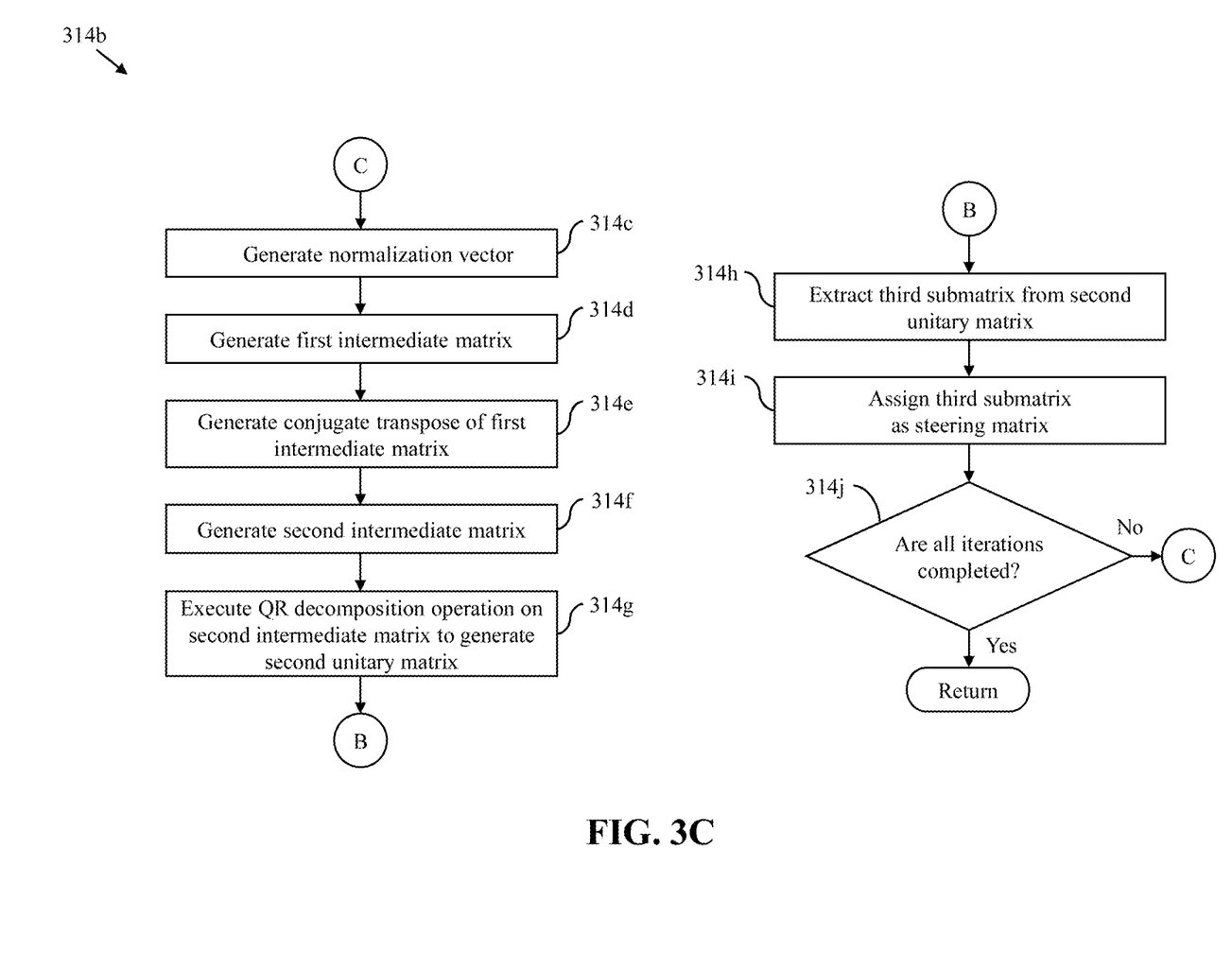

FIGS. 3A-3C, collectively, represents a flowchart 300 that illustrates a beamforming method in accordance with an embodiment of the present disclosure. The beamforming method can correspond to implementing beamforming between the beamformer 102 and the beamformee 104 in the wireless network 100.

Referring now to FIG. 3A, at step 302, the beamformee 104 can receive the NDP from the beamformer 102. At step 304, the beamformee 104 can generate the channel coefficient matrix associated with the channel 106 based on the received NDP. The number of rows and the number of columns of the channel coefficient matrix can be equal to the third count and the second count, respectively. At step 306, the beamformee 104 can execute the first singular value decomposition operation on the channel coefficient matrix to generate the first diagonal matrix and the first unitary matrix. The number of rows and the number of columns of the first diagonal matrix can be equal to the third count and the second count, respectively. Further, each of the number of rows and the number of columns of the first unitary matrix can be equal to the second count.

At step 308, the beamformee 104 can extract the first and second submatrices from the first diagonal matrix and the first unitary matrix, respectively. Each of the number of rows and the number of columns of the first submatrix can be equal to the first count. Further, the number of rows and the number of columns of the second submatrix can be equal to the second count and the first count, respectively. At step 310, the beamformee 104 can generate the conjugate transpose of the second submatrix. At step 312, the beamformee 104 can generate the subspace matrix such that the subspace matrix is the product of the first submatrix and the conjugate transpose of the second submatrix. Thus, the number of rows and the number of columns of the subspace matrix can be equal to the first count and the second count, respectively. At step 314, the beamformee 104 can generate the steering matrix based on the subspace matrix.

Referring now to FIG. 3B, at step 314a, the beamformee 104 can initialize the steering matrix such that the steering matrix corresponds to the second submatrix. At step 314b, the beamformee 104 can iteratively update the steering matrix based on the subspace matrix.

Referring now to FIG. 3C, at step 314c, the beamformee 104 can generate, based on the steering matrix, the normalization vector that includes the plurality of normalization elements. For the first iteration, the steering matrix is equal to the second submatrix. Each normalization element of the plurality of normalization elements can be inversely proportional to the row norm of the associated row of the steering matrix and the regularization factor. Further, the regularization factor decreases with each iteration associated with the steering matrix.

At step 314d, the beamformee 104 can generate the first intermediate matrix based on the normalization vector and the subspace matrix. The number of rows and the number of columns of the first intermediate matrix can be equal to the first count and the second count, respectively. The first intermediate matrix can be a scaled version of the subspace matrix such that the first column of the first intermediate matrix is the product of the first normalization element of the plurality of normalization elements and the first column of the subspace matrix.

At step 314e, the beamformee 104 can generate the conjugate transpose of the first intermediate matrix. At step 314f, the beamformee 104 can generate the second intermediate matrix such that the second intermediate matrix is the product of the conjugate transpose of the first intermediate matrix, the first intermediate matrix, and the steering matrix. The number of rows and the number of columns of the second intermediate matrix can thus be equal to the second count and the first count, respectively. At step 314g, the beamformee 104 can execute the QR decomposition operation on the second intermediate matrix to generate the second unitary matrix. Each of the number of rows and the number of columns of the second unitary matrix can be equal to the second count.

At step 314h, the beamformee 104 can extract the third submatrix from the second unitary matrix such that the number of rows and the number of columns of the third submatrix can be equal to the second count and the first count, respectively. At step 314i, the beamformee 104 can assign the third submatrix as the steering matrix.

At step 314j, the beamformee 104 can determine whether all iterations are completed. If at step 314j, the beamformee 104 determines that all iterations are not completed, steps 314c-314i are executed again. If at step 314j, the beamformee 104 determines that all iterations are completed, step 316 is executed. Thus, the steering matrix is updated with each iteration such that the steering matrix converges to the desired steering matrix. The steering matrix (i.e., the third submatrix of the last iteration) is generated such that when the row normalization operation is executed thereon, the steering matrix is not distorted, thereby ensuring optimal beamforming performance between the beamformer 102 and the beamformee 104.

Referring back to FIG. 3A, at step 316, the beamformee 104 can transmit the steering matrix (i.e., the third submatrix of the last iteration) to the beamformer 102. The beamformer 102 can generate the row-normalized steering matrix by executing the row normalization operation on the steering matrix, and based on the row-normalized steering matrix, beamform the set of wireless signals to the beamformee 104. At step 318, the beamformee 104 can receive the set of wireless signals from the beamformer 102. Beamforming between the beamformer 102 and the beamformee 104 is thus implemented.

The scope of the present disclosure is not limited to the beamformee 104 generating the steering matrix in the above-described manner. In various other embodiments, the beamformee 104 can generate the steering matrix in a different manner as compared to that described above. In such a scenario, beamforming between the beamformer 102 and the beamformee 104 can be implemented in a similar manner as described above except that steps 314e-314g can be replaced with the execution of the second singular value decomposition operation on the first intermediate matrix to generate the third unitary matrix. Further, at steps 314h and 314i, the fourth submatrix can be extracted from the third unitary matrix and assigned as the steering matrix, respectively.

Thus, in the present disclosure, the steering matrix is generated based on the right singular vector matrix of the product of the subspace matrix (i.e., the subspace of the channel coefficient matrix) and the second diagonal matrix. As a result, when the row normalization operation is executed on the steering matrix, the steering matrix is not distorted. Further, the beamformee 104 of the present disclosure generates the steering matrix by iteratively updating the second submatrix based on the subspace matrix. Such iterative update operations include matrix generation and decomposition operations that are executed by the same circuit (i.e., the second processing circuit 118) that generates the first diagonal matrix and the first unitary matrix. Hence, a need to include additional control circuits in the beamformee 104 for generating the steering matrix is eliminated. As a result, a design complexity of the beamformee 104 of the present disclosure is significantly less than that of a conventional beamformee. The conventional beamformee corresponds to a beamformee that includes additional control circuits for executing a convex optimization technique to generate the steering matrix. Additionally, a manufacturing cost of the beamformee 104 of the present disclosure is significantly less than that of the conventional beamformee.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. A beamformee comprising:
a processing circuit configured to:
execute, to generate a diagonal matrix and a first unitary matrix, a first singular value decomposition operation on a channel coefficient matrix associated with a channel between the beamformee and a beamformer;
extract a first submatrix and a second submatrix from the diagonal matrix and the first unitary matrix, respectively, wherein the first submatrix has a number of rows equal to a first count of a plurality of spatial streams associated with the beamformer and a number of columns equal to the first count, and wherein the second submatrix has a number of rows and a number of columns equal to a second count of a plurality of beamformer antennas of the beamformer and the first count, respectively;
generate a subspace matrix such that the subspace matrix is a product of the first submatrix and a conjugate transpose of the second submatrix; and
generate a steering matrix based on the subspace matrix, wherein beamforming between the beamformer and the beamformee is implemented based on the steering matrix.

2. The beamformee of claim 1, further comprising a plurality of beamformee antennas coupled with the processing circuit, wherein the processing circuit is further configured to:
receive, using the plurality of beamformee antennas, a null data packet (NDP) from the beamformer; and
generate, based on the NDP, the channel coefficient matrix such that a number of rows and a number of columns of the channel coefficient matrix are equal to a third count of the plurality of beamformee antennas and the second count, respectively.

3. The beamformee of claim 2, wherein the diagonal matrix has a number of rows and a number of columns equal to the third count and the second count, respectively, and wherein the first unitary matrix has a number of rows equal to the second count and a number of columns equal to the second count.

4. The beamformee of claim 1, further comprising a plurality of beamformee antennas coupled with the processing circuit, wherein the processing circuit is further configured to transmit, using the plurality of beamformee antennas, the steering matrix to the beamformer.

5. The beamformee of claim 1, further comprising a plurality of beamformee antennas coupled with the processing circuit, wherein the processing circuit is further configured to receive, from the beamformer using the plurality of beamformee antennas, a set of wireless signals that is generated based on the steering matrix.

6. The beamformee of claim 1, wherein the first singular value decomposition operation comprises a plurality of QR decomposition operations.

7. The beamformee of claim 1, wherein the processing circuit is further configured to generate the conjugate transpose of the second submatrix.

8. The beamformee of claim 1, wherein to generate the steering matrix, the processing circuit is further configured to:
initialize the steering matrix such that the steering matrix corresponds to the second submatrix; and
iteratively update the steering matrix based on the subspace matrix.

9. The beamformee of claim 8, wherein to iteratively update the steering matrix, the processing circuit is further configured to:
generate, based on the steering matrix, a normalization vector that includes a plurality of normalization elements, wherein a fourth count of the plurality of normalization elements is equal to the second count; and
generate, based on the normalization vector and the subspace matrix, a first intermediate matrix such that a number of rows and a number of columns of the first intermediate matrix are equal to the first count and the second count, respectively.

10. The beamformee of claim 9, wherein to iteratively update the steering matrix, the processing circuit is further configured to:
generate a conjugate transpose of the first intermediate matrix;
generate a second intermediate matrix such that the second intermediate matrix is a product of the conjugate transpose of the first intermediate matrix, the first intermediate matrix, and the steering matrix;
execute a QR decomposition operation on the second intermediate matrix to generate a second unitary matrix, wherein the second unitary matrix has a number of rows equal to the second count and a number of columns equal to the second count;
extract a third submatrix from the second unitary matrix such that a number of rows and a number of columns of the third submatrix are equal to the second count and the first count, respectively; and
assign the third submatrix as the steering matrix.

11. The beamformee of claim 9, wherein to iteratively update the steering matrix, the processing circuit is further configured to:
execute a second singular value decomposition operation on the first intermediate matrix to generate a third unitary matrix, wherein the third unitary matrix has a number of rows equal to the second count and a number of columns equal to the second count;
extract a fourth submatrix from the third unitary matrix such that a number of rows and a number of columns of the fourth submatrix are equal to the second count and the first count, respectively; and
assign the fourth submatrix as the steering matrix.

12. The beamformee of claim 9, wherein each normalization element of the plurality of normalization elements is inversely proportional to (i) a row norm of an associated row of the steering matrix and (ii) a regularization factor, and wherein the regularization factor decreases with each iteration associated with the steering matrix.

13. The beamformee of claim 9, wherein the first intermediate matrix is a scaled version of the subspace matrix such that a first column of the first intermediate matrix is a product of a first normalization element of the plurality of normalization elements and a first column of the subspace matrix.

14. A beamforming method, comprising:
executing, by a beamformee, to generate a diagonal matrix and a first unitary matrix, a first singular value decomposition operation on a channel coefficient matrix associated with a channel between the beamformee and a beamformer;
extracting, by the beamformee, a first submatrix and a second submatrix from the diagonal matrix and the first unitary matrix, respectively, wherein the first submatrix has a number of rows equal to a first count of a plurality of spatial streams associated with the beamformer and a number of columns equal to the first count, and wherein the second submatrix has a number of rows and a number of columns equal to a second count of a plurality of beamformer antennas of the beamformer and the first count, respectively;
generating, by the beamformee, a subspace matrix such that the subspace matrix is a product of the first submatrix and a conjugate transpose of the second submatrix; and
generating, by the beamformee, a steering matrix based on the subspace matrix, wherein beamforming between the beamformer and the beamformee is implemented based on the steering matrix.

15. The beamforming method of claim 14, further comprising:
receiving, by the beamformee, using a plurality of beamformee antennas thereof, a null data packet (NDP) from the beamformer; and
generating, by the beamformee, based on the NDP, the channel coefficient matrix such that a number of rows and a number of columns of the channel coefficient matrix are equal to a third count of the plurality of beamformee antennas and the second count, respectively.

16. The beamforming method of claim 15, wherein the diagonal matrix has a number of rows and a number of columns equal to the third count and the second count, respectively, and wherein the first unitary matrix has a number of rows equal to the second count and a number of columns equal to the second count.

17. The beamforming method of claim 14, further comprising:
transmitting, by the beamformee, using a plurality of beamformee antennas thereof, the steering matrix to the beamformer; and
receiving, by the beamformee, from the beamformer using the plurality of beamformee antennas, a set of wireless signals that is generated based on the steering matrix.

18. The beamforming method of claim 14, wherein the step of generating the steering matrix further comprises:
- initializing, by the beamformee, the steering matrix such that the steering matrix corresponds to the second submatrix; and
- iteratively updating, by the beamformee, the steering matrix based on the subspace matrix.

19. The beamforming method of claim 18, wherein the step of iteratively updating the steering matrix further comprises:
- generating, by the beamformee, based on the steering matrix, a normalization vector that includes a plurality of normalization elements, wherein a fourth count of the plurality of normalization elements is equal to the second count;
- generating, by the beamformee, based on the normalization vector and the subspace matrix, a first intermediate matrix such that a number of rows and a number of columns of the first intermediate matrix are equal to the first count and the second count, respectively;
- generating, by the beamformee, a conjugate transpose of the first intermediate matrix;
- generating, by the beamformee, a second intermediate matrix such that the second intermediate matrix is a product of the conjugate transpose of the first intermediate matrix, the first intermediate matrix, and the steering matrix;
- executing, by the beamformee, a QR decomposition operation on the second intermediate matrix to generate a second unitary matrix, wherein the second unitary matrix has a number of rows equal to the second count and a number of columns equal to the second count;
- extracting, by the beamformee, a third submatrix from the second unitary matrix such that a number of rows and a number of columns of the third submatrix are equal to the second count and the first count, respectively; and
- assigning, by the beamformee, the third submatrix as the steering matrix.

20. The beamforming method of claim 19, wherein each normalization element of the plurality of normalization elements is inversely proportional to (i) a row norm of an associated row of the steering matrix and (ii) a regularization factor, wherein the regularization factor decreases with each iteration associated with the steering matrix, and wherein the first intermediate matrix is a scaled version of the subspace matrix such that a first column of the first intermediate matrix is a product of a first normalization element of the plurality of normalization elements and a first column of the subspace matrix.

* * * * *